United States Patent
Ho et al.

(10) Patent No.: US 8,436,547 B2
(45) Date of Patent: May 7, 2013

(54) MULTI-LAMP DRIVING SYSTEM

(75) Inventors: Chi-Hsien Ho, Jhongli (TW); Chin-Po Cheng, Jhongli (TW)

(73) Assignee: Ampower Technology Co., Ltd., Jhongli, Taoyuan County (TW)

( * ) Notice: Subject to any disclaimer, the term of this patent is extended or adjusted under 35 U.S.C. 154(b) by 251 days.

(21) Appl. No.: 13/097,067

(22) Filed: Apr. 29, 2011

(65) Prior Publication Data

US 2012/0187866 A1 Jul. 26, 2012

(51) Int. Cl.
*H05B 41/16* (2006.01)
(52) U.S. Cl.
USPC ............... 315/276; 315/220; 315/254
(58) Field of Classification Search .......... 315/276–277, 315/219–220, 254–255, 257
See application file for complete search history.

(56) References Cited

U.S. PATENT DOCUMENTS

| | | | | |
|---|---|---|---|---|
| 6,104,146 A * | 8/2000 | Chou et al. | ..... | 315/277 |
| 6,954,364 B2 * | 10/2005 | Min | ..... | 363/56.08 |
| 7,218,059 B2 * | 5/2007 | Li et al. | ..... | 315/209 R |
| 7,911,440 B2 * | 3/2011 | Lee | ..... | 345/102 |

* cited by examiner

*Primary Examiner* — James H Cho
(74) *Attorney, Agent, or Firm* — Altis Law Group, Inc.

(57) ABSTRACT

A multi-lamp driving system includes a filter circuit, a switch circuit, a pulse width modulation (PWM) controller, a protection circuit, transformers, and an abnormity detection circuit. Primary windings of the transformers are connected to the switch circuit in parallel, and high voltage terminals of secondary windings of the transformers are connected to lamps respectively. The abnormity detection circuit converts current signals flowing through the lamps into voltage signals, and retrieves highest and lowest voltage signals corresponding to highest and lowest current signal respectively. Then the abnormity detection circuit determines if a difference between the highest voltage signal and the lowest voltage signal exceeds a predetermined value, and generates a trigger signal if the difference between the highest and lowest voltage signals exceeds the predetermined value. The protection circuit receives the trigger signal, and controls the PWM controller to stop outputting PWM signals to the switch circuit.

7 Claims, 3 Drawing Sheets

MULTI-LAMP DRIVING SYSTEM

BACKGROUND

1. Technical Field

The disclosure relates to backlight driving systems, and particularly to a multi-lamp driving system.

2. Description of Related Art

Cold cathode fluorescent lamps (CCFL) are usually used for a backlight of a liquid crystal display. An inverter converts direct current power into alternating current power to provide proper driving power to light the CCFL. There is a circuit in the inverter that is used to detect abnormity and to protect the CCFLs and the inverter. Usually, the circuit compares the detected signals with a predetermined reference voltage to determine if acts to protect the CCFLs and the inverter. However, because the predetermined reference voltage is a fixed voltage, the circuit may mis-compare the detected signals with the predetermined reference voltage due to change of environment temperature and lamp parameters.

DETAILED DESCRIPTION

Figure 1:
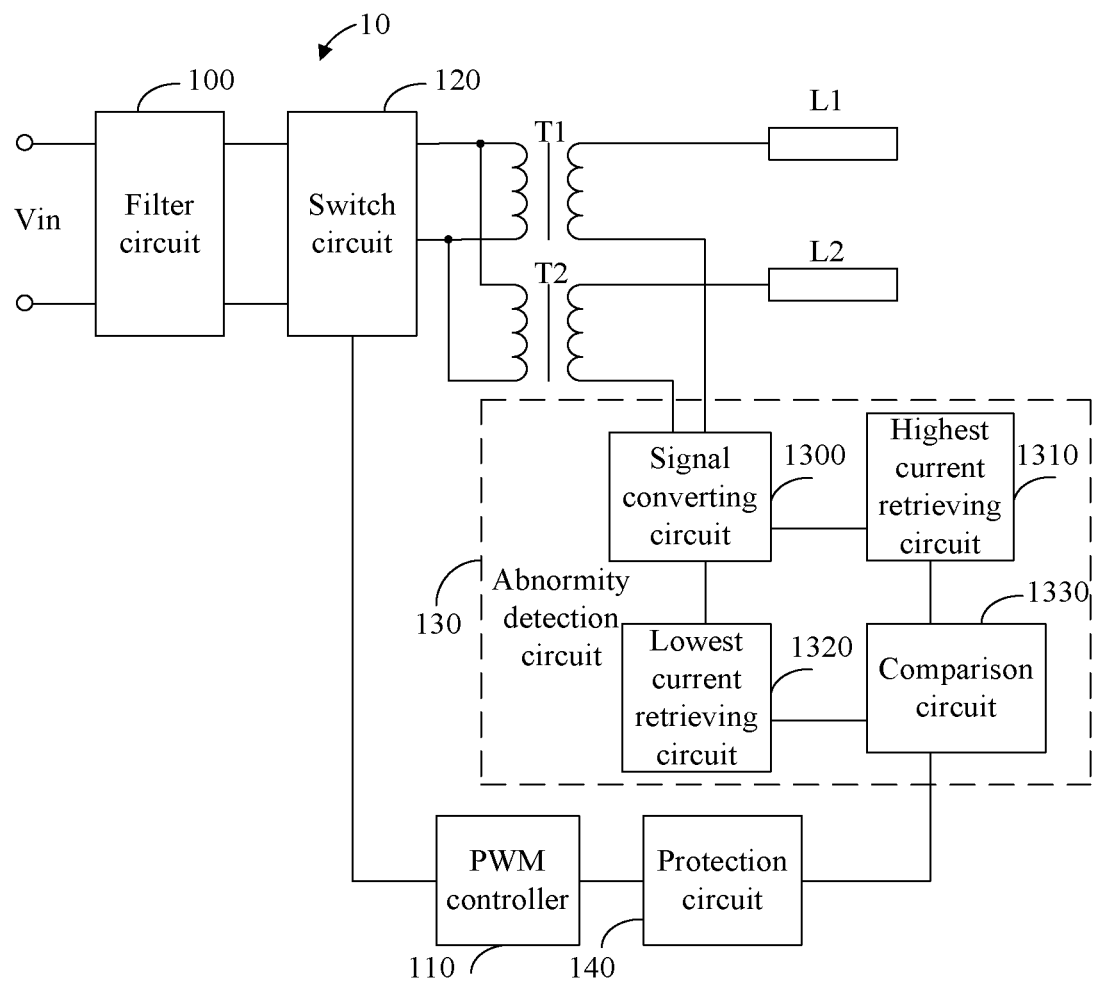
FIG. 1 is a schematic diagram of one embodiment of a multi-lamp driving system as disclosed.

FIG. 1 is a schematic diagram of one embodiment of a multi-lamp driving system 10 as disclosed. In one embodiment, the multi-lamp driving system 10 converts an input power supply Vin into alternating current (AC) power to drive a plurality of lamps L1、L2 (only two shown). The input power supply Vin is a direct current (DC) power supply. In alternative embodiments, the input power supply Vin may be an AC power supply. The multi-lamp driving system 10 includes a filter circuit 100, a switch circuit 120, a pulse width modulation (PWM) controller 110, a plurality of transformers T1, T2 (only two shown), an abnormity detection circuit 130, and a protection circuit 140. The filter circuit 100 filters input power signals of the input power supply Vin, and includes capacitors, such as, three capacitors in parallel. The filter circuit 100 outputs DC power signals to the switch circuit 120 after filtering the input power signals of the input power supply Vin.

The switch circuit 120 converts the DC power signals from the filter circuit 100 into first AC power signals. In one embodiment, the first AC power signals are square wave signals. The switch circuit 120 may be one of a full bridge circuit, a half bridge circuit, and a push-pull circuit. The PWM controller 110 generates PWM signals to control on-off of the switch circuit 120, thus, the switch circuit 120 converts the DC power signals from the filter circuit 100 into the first AC power signals. The protection circuit 140 notifies the PWM controller 110 to stop outputting the PWM signals when the multi-lamp driving system 10 or the lamps L1 or L2 is abnormal. Thus, the switch circuit 120 stops converting, and the multi-lamp driving system 10 is turned off, which avoids damage.

Each of the transformers T1 and T2 includes a primary winding and a secondary winding. The primary windings of the transformers T1 and T2 are connected to the switch circuit 120 is parallel, and high voltage terminals of the secondary windings of the transformers T1 and T2 are connected to the lamps L1 and L2, respectively. That is, the high voltage terminal of the secondary winding of the transformer T1 is connected to the lamp L1, and the high voltage terminal of the secondary winding of the transformer T2 is connected to the lamp L2. The transformers T1 and T2 convert the first AC power signals from the switch circuit 120 into second AC power signals. In one embodiment, the second AC power signals are sine wave signals.

The abnormity detection circuit 130 is connected to the transformers T1 and T2 and the protection circuit 140, and detects if the multi-lamp driving system 10 and the lamps L1 and L2 are abnormal. The abnormity detection circuit 130 includes a signal converting circuit 1300, a highest current retrieving circuit 1310, a lowest current retrieving circuit 1320, and a comparison circuit 1330. The signal converting circuit 1300 is connected to low voltage terminals of the secondary windings of the transformers T1 and T2, and converts current signals flowing through the lamps L1 and L2 into voltage signals. The highest current retrieving circuit 1310 is connected to the signal converting circuit 1300, and retrieves a highest voltage signal from the voltage signals corresponding to a highest current signal flowing through the lamps L1 and L2. The lowest current retrieving circuit 1320 is connected to the signal converting circuit 1300, and retrieves a lowest voltage signal corresponding to a lowest current signal flowing through the lamps L1 and L2.

The comparison circuit 1330 is connected to the highest current retrieving circuit 1310 and the lowest current retrieving circuit 1320, and determines if a difference between the highest voltage signal and the lowest voltage signal exceeds a predetermined value. If the difference between the highest voltage signal and the lowest voltage signal exceeds the predetermined value, the comparison circuit 1330 generates a trigger signal to trigger the protection circuit 140. In one embodiment, the predetermined value can be set according to actual needs, such as, to be 0.7V. Upon receiving the trigger signal, the protection circuit 140 controls the PWM controller 110 to stop outputting the PWM signals to the switch circuit 120. Thus, the switch circuit 120 stops operation.

The multi-lamp driving system 10 dynamically retrieves the highest current signal and the lowest current signal to compare to determine if there is abnormity, replacing with comparison with a fixed reference voltage. Thus, when environment temperature and parameters of the lamps L1 and L2 change, the highest current signal and the lowest current signal change correspondingly, which avoids misact. In addition, when the multi-lamp driving system 10 is tested for some safety standard items, such as, an item of touch current, the lamps L1 and L2 are shorten to make that capacitors of the lamps L1 and L2 do not participate in resonance, which results in phase shift of current signals flowing through the lamps L1 and L2. The abnormity detection circuit 130 can detects this abnormity, and triggers the protection circuit 140.

Figure 2:
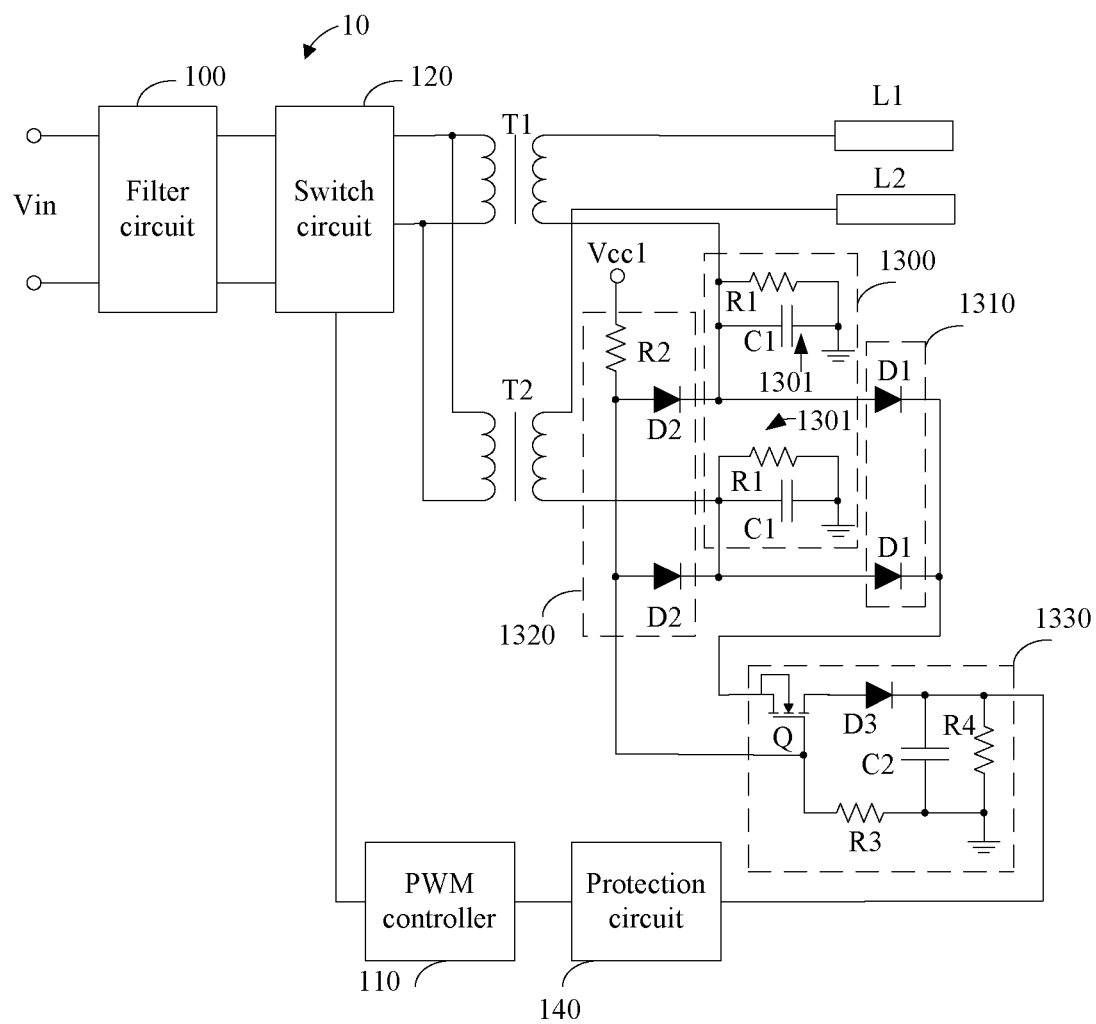
FIG. 2 is a circuit diagram of one embodiment of a multi-lamp driving system as disclosed.

FIG. 2 is a circuit diagram of a first embodiment of the multi-lamp driving system 10 as disclosed. In one embodiment, the signal converting circuit 1300 includes a plurality of signal converting units 1301, and the plurality of signal converting units 1301 are correspondingly connected to the low voltage terminals of the secondary windings of the transformers T1 and T2. That is, a first signal converting unit 1301 is connected to the low voltage terminal of the secondary winding of the transformer T1, and a second signal converting unit 1301 is connected to the low voltage terminal of the secondary winding of the transformer T2. Each of the plurality of signal converting units 1301 converts the current signals flowing through corresponding lamps L1 and L2 into the voltage signals, and includes a first resistor R1 and a first capacitor C1. The first resistor R1 is connected between the low voltage terminal of the secondary winding of the corresponding transformer and the ground. The first capacitor C1 is connected to the first resistor R1 in parallel. The first resistor R1 converts the current signal flowing through the corresponding lamp into the voltage signal, and the first capacitor C1 filters the voltage signal to retrieve a stable voltage signal. In one embodiment, the voltage signal may be an AC signal.

The highest current retrieving circuit 1310 includes a plurality of first diodes D1, and the plurality of first diodes D1 are correspondingly connected to the plurality of signal converting unit 1301 and the low voltage terminals of the secondary windings of the transformers T1 and T2. Anodes of the plurality of first diodes D1 are correspondingly connected to the low voltage terminals of the secondary windings of the transformers T1 and T2, and cathodes of the plurality of first diodes D1 are connected together to output the highest voltage signal. The plurality of first diodes D1 selects the highest voltage signal from the voltage signals from the signal converting units 1301, and outputs the highest voltage signal to the comparison circuit 1330.

The lowest current retrieving circuit 1320 includes a plurality of second diodes D2, and the plurality of second diodes D2 are correspondingly connected to the plurality of signal converting units 1301 and the low voltage terminals of the secondary windings of the transformers T1 and T2. Cathodes of the plurality of second diodes D2 are correspondingly connected to the low voltage terminals of the secondary windings of the transformers T1 and T2. Anodes of the plurality of second diodes D2 are connected together, receive a first reference voltage Vcc1 via a second resistor R2, and output the lowest voltage signal to the comparison circuit 1330. In one embodiment, the highest voltage signal and the lowest voltage signal may both be AC signals.

The comparison circuit 1330 includes a switch Q, a third diode D3, a third resistor R3, a second capacitor C2, and a fourth resistor R4. The switch Q includes a control pole, a first pole, and a second pole. The control pole of the switch Q is connected to the anodes of the plurality of second diodes D2, that is, receives the lowest voltage signal, and is grounded via the third resistor R3. The first pole of the switch Q is connected to the cathodes of the plurality of first diodes D1, that is, receives the highest voltage signal. The third pole of the switch Q is connected to an anode of the third diode D3, and a cathode of the third diode D3 outputs the trigger signal to the protection circuit 140. The fourth resistor R4 is connected between the cathode of the third diode D3 and the ground, and the second capacitor C2 is connected to the fourth resistor R4 in parallel. The third diode D3, the second capacitor C2, and the fourth resistor R4 convert the AC highest voltage signal into DC signal to output to the protection circuit 140, that is, the trigger signal is the DC signal.

In one embodiment, the switch Q may be a P-type metal oxide semiconductor field effect transistor (MOSFET), the control pole is a gate of the PMOSFET, the first pole is a source of the PMOSFET, and the second pole is a drain of the PMOSFET.

In one embodiment, the lamps L1 and L2 have the same parameters, the transformers T1 and T2 have the same parameters, the plurality of signal converting units 1301 have the same parameters, the plurality of first diodes D1 have the same parameters, and the plurality of second diodes D2 have the same parameters. Therefore, if the multi-lamp driving system 10 and the lamps L1 and L2 are normal, the current flowing through the lamps L1 and L2 is nearly the same, and the difference between the current flowing through the lamps L1 and L2 does not exceed the predetermined value. Thus, the comparison circuit 1330 generates no trigger signals, and the protection circuit 140 does not operate.

If one of the multi-lamp driving system 10 and the lamps L1 and L2 is abnormal, for example, the lamp L1 is open, thus, the current flowing through the lamp L1 is small. Therefore, the voltage signal from the signal converting unit 1301 corresponding to the lamp L1 is less than the voltage signal from the signal converting unit 1301 corresponding to the lamp L2. Because the plurality of first diodes D1 have the same parameters and the cathodes of the plurality of first diodes D1 are connected together, the first diode D1 corresponding to the lamp L2 is turned on. That is, the plurality of first diodes D1 retrieves the highest voltage signal corresponding to the highest current signal. Voltage on the first pole of the switch Q equals to the highest voltage signal subtracting turning on voltage of the first diode D1.

At the same time, because the plurality of second diodes D2 have the same parameters and the anodes of the plurality of second diodes D2 are connected together, the second diode D2 corresponding to the lamp L1 is turned on. That is, the plurality of second diodes D2 retrieves the lowest voltage signal corresponding to the lowest current signal. Voltage on the control pole of the switch Q equals to the lowest voltage signal adding turning on voltage of the second diode D2. Because the lowest voltage signal is nearly 0, and the highest voltage signal may be several volts, the switch Q is turned on. The highest voltage signal is input into the anode of the third diode D3, and is transformed to the trigger signal of DC mode after rectifying and filtering by the third diode D3, the second capacitor C2 and the fourth resistor R4. Thus, the abnormity detection circuit 130 can detect the abnormity.

Figure 3:
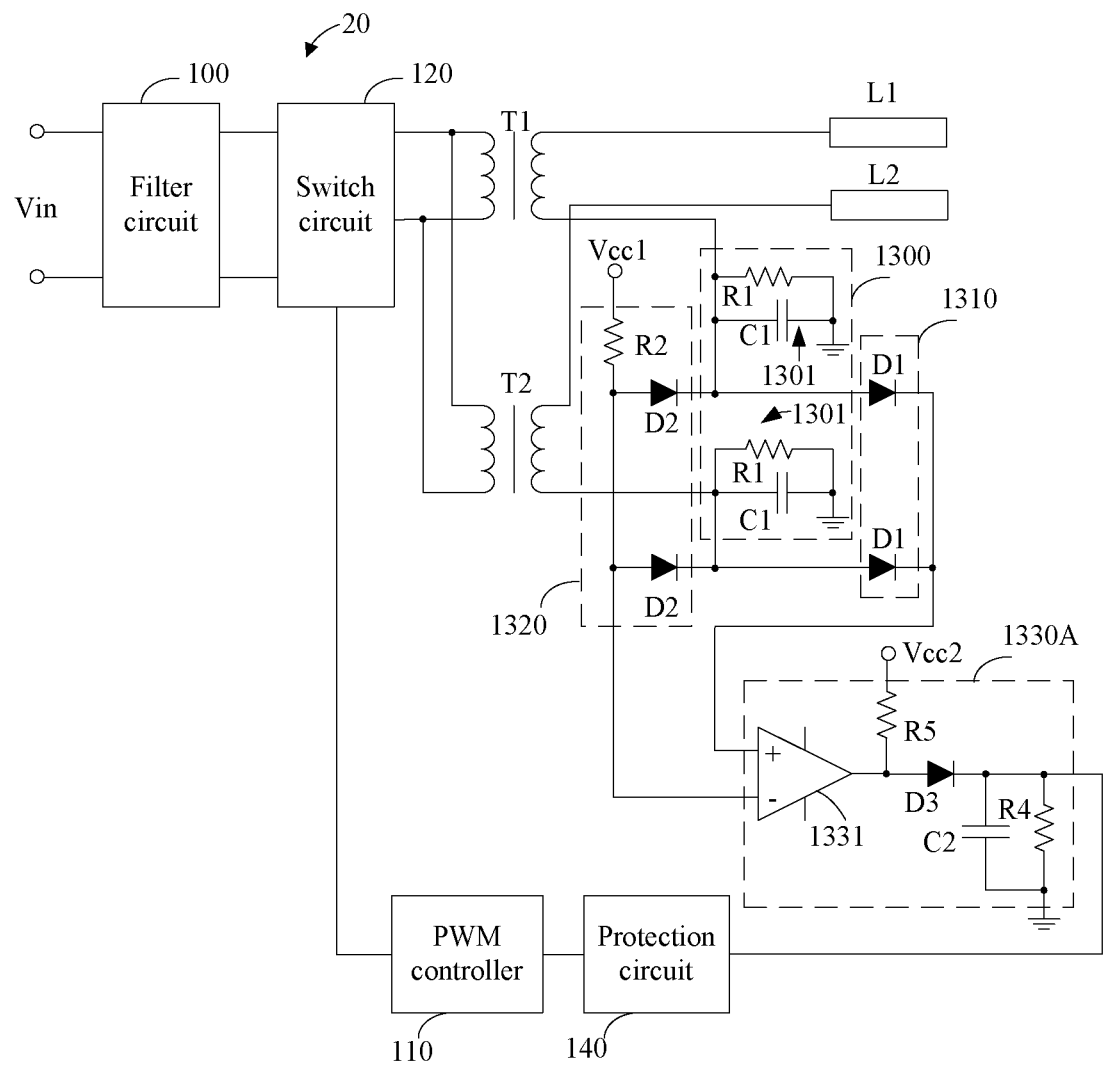
FIG. 3 is a circuit diagram of another embodiment of a multi-lamp driving system as disclosed.

FIG. 3 is a circuit diagram of a second embodiment of a multi-lamp driving system 20 as disclosed. The multi-lamp driving system 20 is similar to the multi-lamp driving system 10 except that a structure of a comparison circuit 1330A is different from that of the comparison circuit 1330, therefore, descriptions of other same structures are omitted here. The comparison circuit 1330A includes a comparator 1331, the third diode D3, the second capacitor C2, the fourth resistor R4, and a fifth resistor R5. A non-inverting input of the comparator 1331 is connected to the cathodes of the plurality of first diodes D1, an inverting input of the comparator 1331 is connected to the anodes of the plurality of second diodes D2, and an output of the comparator 1331 is connected to the anode of the third diode D3. One end of the fifth resistor R5 is connected to the output of the comparator 1331, and another end of the fifth resistor R5 receives a second reference voltage. Connections and functions of the third diode D3, the second capacitor C2, and the fourth resistor R4 are the same as that of FIG. 2, therefore, descriptions are omitted here. In this embodiment, the working principle of the comparison circuit 1330A is similar to that of the comparison circuit 1330, therefore, descriptions are omitted here.

The multi-lamp driving systems 10 and 20 dynamically retrieves the highest current signal and the lowest current signal to compare to determine if there is abnormity, replacing with comparison with a fixed reference voltage. Thus, when environment temperature and parameters of the lamps L1 and L2 change, the highest current signal and the lowest current signal change correspondingly, which avoids influence on abnormity determination and misact.

The foregoing disclosure of various embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto and their equivalents.

What is claimed is:

1. A multi-lamp driving system, to drive a plurality of lamps, comprising a filter circuit, a switch circuit, a pulse width modulation (PWM) controller, and a protection circuit, wherein the multi-lamp driving system further comprises:
a plurality of transformers, each of the plurality of transformers comprising a primary winding and a secondary winding, wherein the primary windings of the plurality of transformers are connected to the switch circuit in parallel, and high voltage terminals of the secondary windings of the plurality of transformers are connected to the plurality of lamps, respectively;
an abnormity detection circuit, connected to the plurality of transformers and the protection circuit, the abnormity detection circuit comprising:
a signal converting circuit, connected to low voltage terminals of the secondary windings of the plurality of transformers, to convert current signals flowing through the plurality of lamps into voltage signals;
a highest current retrieving circuit, connected to the signal converting circuit, to retrieve a highest voltage signal corresponding to a highest current signal flowing through the plurality of lamps from the voltage signals;
a lowest current retrieving circuit, connected to the signal converting circuit, to retrieve a lowest voltage signal corresponding to a lowest current signal flowing the plurality of lamps; and
a comparison circuit, connected to the highest current retrieving circuit and the lowest current retrieving circuit, to determine if a difference between the highest voltage signal and the lowest voltage signal exceeds a predetermined value, and to generate a trigger signal if the difference between the highest voltage signal and the lowest voltage signals exceeds the predetermined value;
wherein upon receiving the trigger signal, the protection circuit controls the PWM controller to stop outputting PWM signals to the switch circuit.

2. The multi-lamp driving system of claim 1, wherein the signal converting circuit comprises a plurality of signal converting units connected to the low voltage terminals of the secondary windings of the plurality of transformers, respectively, each of the plurality of signal converting units comprises a first resistor and a first capacitor, the first resistor is connected between the low voltage terminal of the secondary winding of the corresponding transformer and the ground, and the first capacitor is connected to the first resistor in parallel.

3. The multi-lamp driving system of claim 2, wherein the highest current retrieving circuit comprises a plurality of first diodes connected to the low voltage terminals of the secondary windings of the plurality of transformers, respectively, anodes of the plurality of first diodes are correspondingly connected to the low voltage terminals of the secondary windings of the plurality of transformers, and cathodes of the plurality of second diodes are connected together to output the highest voltage signal.

4. The multi-lamp driving system of claim 3, wherein the lowest current retrieving circuit comprises a plurality of second diodes connected to the low voltage terminals of the secondary windings of the plurality of transformers, respectively, cathodes of the plurality of second diodes are correspondingly connected to the low voltage terminals of the secondary windings of the plurality of transformers, and anodes of the plurality of second diodes are connected together, receives a first reference voltage via a second resistor, and outputs the lowest voltage signal to the comparison circuit.

5. The multi-lamp driving system of claim 4, wherein the comparison circuit comprises:
a switch, comprising a control pole, a first pole, and a second pole, the control pole connected to the anodes of the plurality of second diodes, and the first pole connected to the cathodes of the plurality of first diodes;
a third diode, an anode of the third diode connected to the second pole of the switch, and a cathode of the third diode outputting the trigger signal;
a second capacitor, connected between the cathode of the third diode and the ground; and
a fourth resistor, connected to the second capacitor in parallel.

6. The multi-lamp driving system of claim 5, wherein the switch is a P-type metal oxide semiconductor field effect transistor (PMOSFET), the control pole is a gate of the PMOSFET, the first pole is a source of the PMOSFET, and the second pole is drain of the PMOSFET.

7. The multi-lamp driving system of claim 4, wherein the comparison circuit comprises:
a comparator, comprising an inverting input, a non-inverting input, and an output, the non-inverting input connected to the cathodes of the plurality of first diodes, and the inverting input connected to the anodes of the plurality of second diodes;
a third diode, an anode of the third diode connected to the output of the comparator, and a cathode of the third diode outputting the trigger signal;
a second capacitor, connected between the cathode of the third diode and the ground;
a fourth resistor, connected to the second capacitor in parallel; and
a fifth resistor, one end of the fifth resistor connected to the output of the comparator, and another end of the fifth resistor receiving a second reference voltage.

* * * * *

UNITED STATES PATENT AND TRADEMARK OFFICE
CERTIFICATE OF CORRECTION

PATENT NO. : 8,436,547 B2  Page 1 of 1
APPLICATION NO. : 13/097067
DATED : May 7, 2013
INVENTOR(S) : Chi-Hsien Ho et al.

It is certified that error appears in the above-identified patent and that said Letters Patent is hereby corrected as shown below:

On the title page insert the following:

--(30)   Foreign Application Priority Data

January 26, 2011  (CN) ......................2011 1 0027961--

Signed and Sealed this
Twenty-sixth Day of November, 2013

Margaret A. Focarino
*Commissioner for Patents of the United States Patent and Trademark Office*